United States Patent

[11] 3,562,520

| [72] | Inventor | Ralph W. Hippen |
| | | Houston, Tex. |
| [21] | Appl. No. | 773,011 |
| [22] | Filed | Nov. 4, 1968 |
| [45] | Patented | Feb. 9, 1971 |
| [73] | Assignee | Puretest Water Purifying Company |
| | | Houston, Tex. |
| | | a corporation of Texas |

[54] FAIL-SAFE WATER PURIFYING APPARATUS
2 Claims, 7 Drawing Figs.
[52] U.S. Cl. ..................................... 250/43,
21/102, 250/45, 250/46
[51] Int. Cl. ..................................... G01h 21/26
[50] Field of Search .......................... 250/43,
43.5, 45, 46; 21/102

[56] References Cited
UNITED STATES PATENTS
| 3,182,191 | 5/1965 | McFarland et al. | 250/43 |
| 3,182,193 | 5/1965 | Ellner et al. | 250/43.5 |
| 3,413,465 | 11/1968 | Harrison et al. | 250/43.5 |

Primary Examiner—Archie R. Borchelt
Assistant Examiner—A. L. Birch
Attorney—Charles E. Lightfoot ABSTRACT: Apparatus for the purification of liquid, such as water, by exposing the same to ultraviolet lamp, embodying means forming an annular passageway through which water may flow in surrounding relation to an electric lamp of a type producing ultraviolet light and ultraviolet light-responsive means for shutting off the flow of water therethrough in response to a decrease in the intensity of the ultraviolet light passing through the water when such intensity falls below a predetermined value. The apparatus includes a protective tube of quartz glass surrounding the ultraviolet lamp and wiper means movable in response to the turning off and on of the flow of water through the apparatus to wipe the external surface of the quartz tube.

Means is also provided for preventing the formation of clouded areas on the glass of the lamp due to the positioning of the wiper means at one location surrounding the lamp during long periods of nonoperation of the wiper means while the lamp is on. Means is provided for preventing the wiper means from interferring with the flow of ultraviolet light flowing to the light responsive means by which the flow of water is cut off.

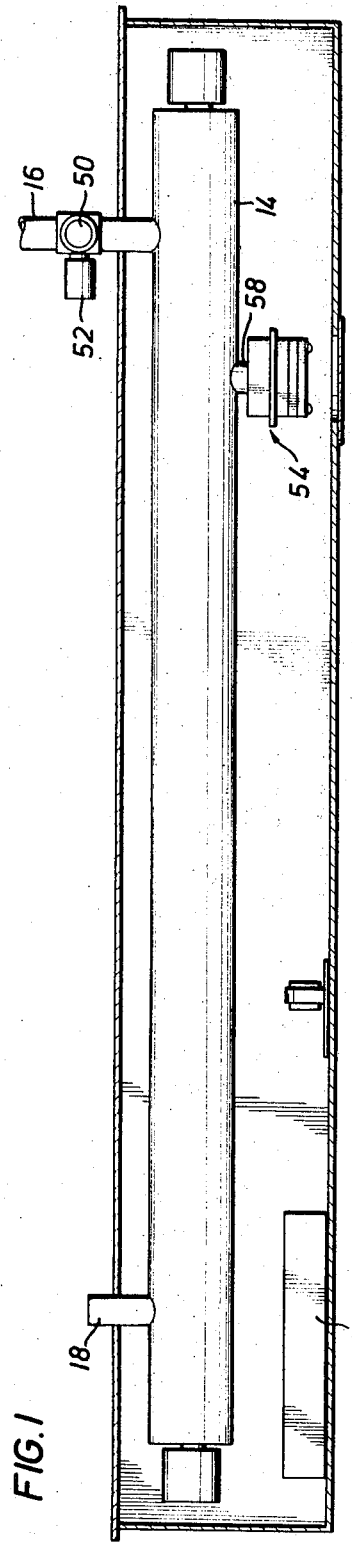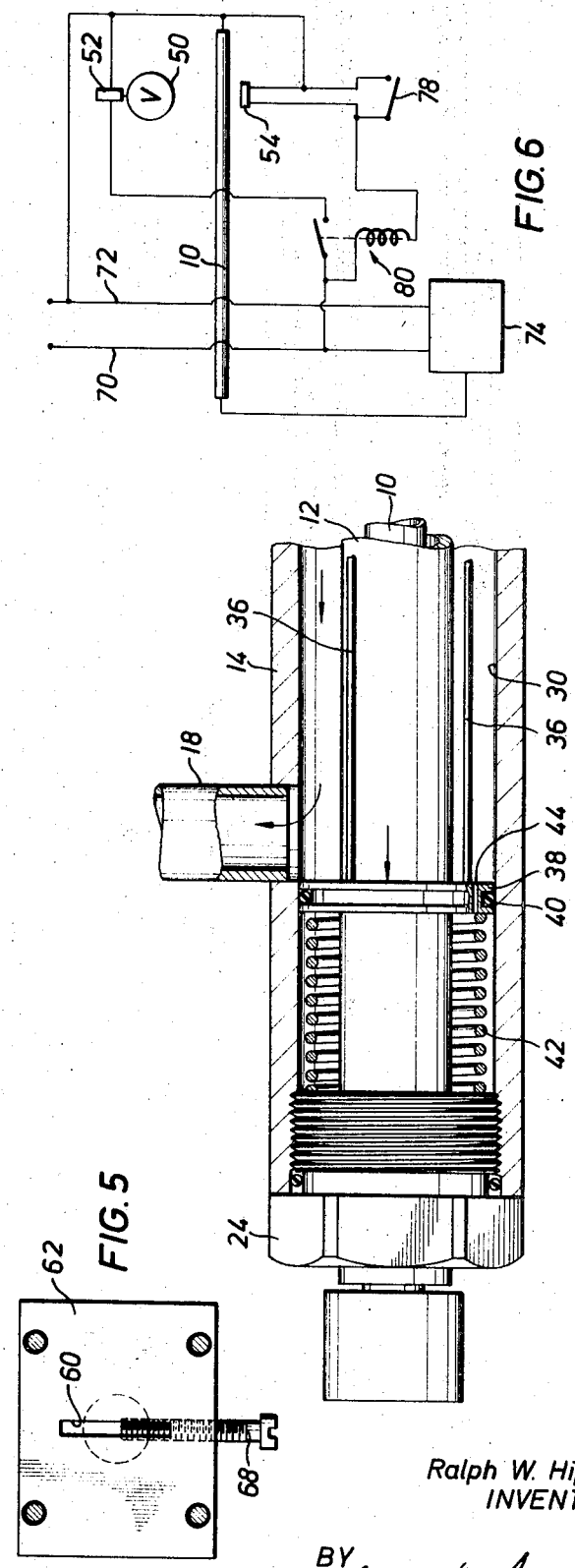

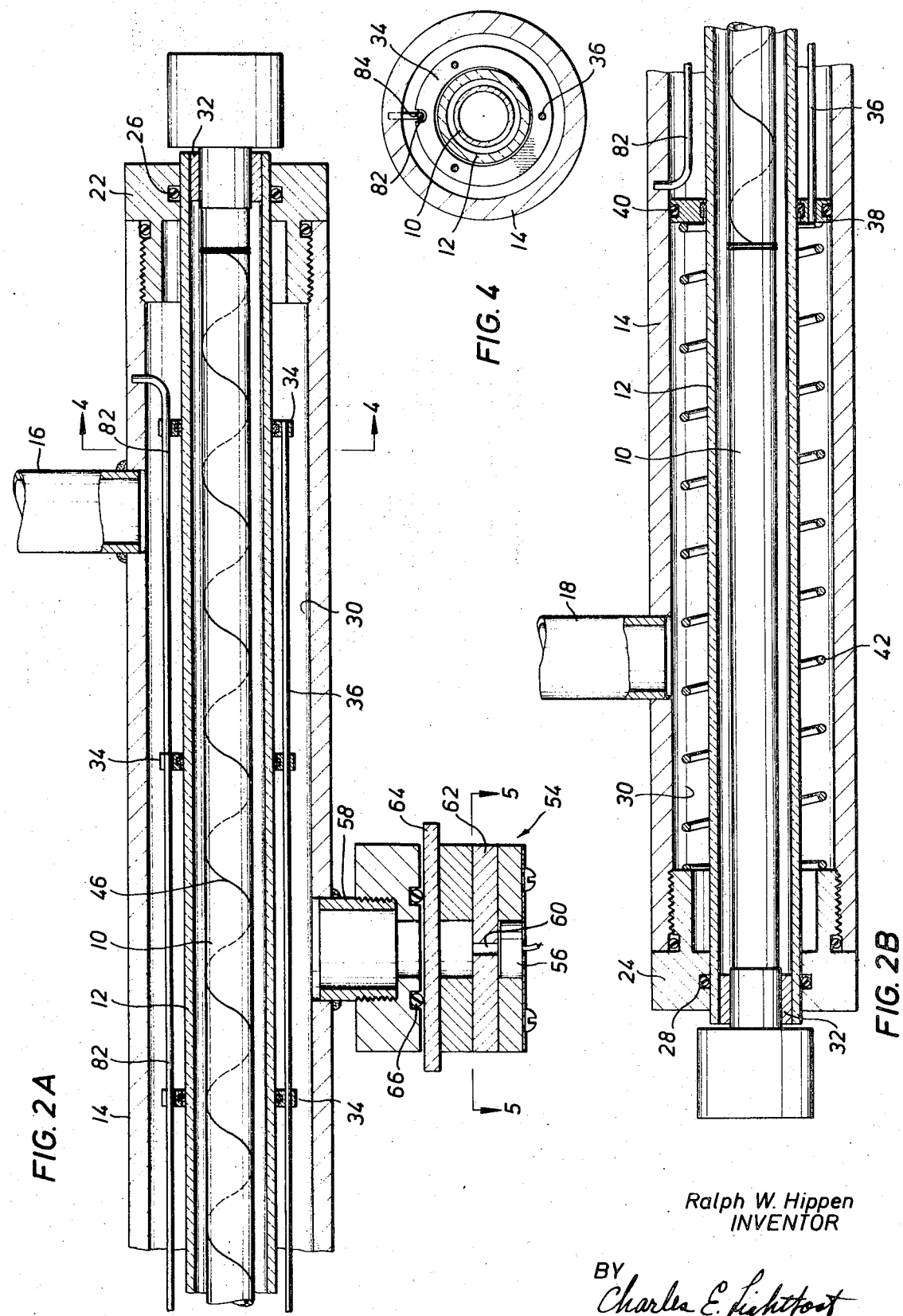

3,562,520

FAIL-SAFE WATER PURIFYING APPARATUS

BACKGROUND OF THE INVENTION

It has been proposed heretofore to purify various materials, especially liquids, such as water, by exposing the same to ultraviolet light.

One type of apparatus heretofore employed for this purpose is disclosed in the U.S. Pat. to Artie F. and Arthur E. McFarland, No. 3,182,191, issued May 4, 1965.

In the apparatus of the above mentioned patent water is passed through a pipe within which a mercury vapor lamp is disposed to subject the water to the ultraviolet light. The lamp is enclosed in a quartz tube to protect the same, which tube is disposed in radially inwardly spaced relation to the inner surface of the pipe to form an annular passageway surrounding the lamp through which the water to be treated may flow. Wiper means is slidably positioned on the exterior of the quartz tube for longitudinal movement therealong in response to the flow of water through the apparatus and the cessation of such flow.

In apparatus of this kind the intensity of the ultraviolet light reaching the water as it flows through the apparatus is often reduced by discoloration of the quartz tube due to minerals in the water, such as dissolved iron, cloudiness due to entrained sediment, or the like, or the efficiency of the lamp is greatly diminished by prolonged use, so that the apparatus is no longer effective to purify the water.

Such impairment of the apparatus is often not apparent since the lamp continues to emanate visible light giving the visual impression that the water passing through the apparatus is being properly treated. Continued use of the apparatus in its impaired condition may lead to the danger of the consumption of contaminated water.

The present invention has for an important object the provision of water purification apparatus of the above mentioned type embodying fail-safe means for preventing the use of such apparatus in the event that its effectiveness to purify the water passing therethrough becomes impaired.

Another object of the invention is the provision, in water purification apparatus of the kind referred to, of means responsive to a reduction in the intensity of the ultraviolet light passing through the water under treatment for shutting off the flow of water until the impaired condition has been corrected.

A further object of the invention is to provide improved wiper mechanism in water purification apparatus of the type referred to.

A still further object of the invention is to provide a means for preventing loss of transparency or reduction in the intensity of the ultraviolet emanation from an ultraviolet lamp of the mercury vapor type due to discoloration of the glass or the formation thereon of light obstructing deposits.

SUMMARY OF THE INVENTION

Briefly described the water purifying apparatus of the invention comprises an ultraviolet lamp of the mercury vapor type, enclosed in a protective tube of quartz glass, surrounded by an outer pipe to form an annular passageway between the pipe or tube through which water may flow while being exposed to ultraviolet light to destroy bacteria or the like in the water. A wiper assembly is provided for wiping the external surface of the quartz tube, which assembly is operated in response to the turning on and off of the flow of water through the apparatus.

The apparatus includes means responsive to a reduction in the intensity of the ultraviolet light passing through the water under treatment for turning off the flow of water when such intensity falls below a predetermined value, whereby the apparatus is rendered inoperative in the event that its efficiency is impaired to an extent such that the water is no longer properly purified. Means is also provided for preventing the formation of light intensity reducing deposits on the glass of the lamp due to continued operation of the lamp while the wiper mechanism is at rest.

BRIEF DESCRIPTION OF THE VIEWS OF THE DRAWINGS

FIG. 1 is a side elevational view, partly in cross section, and on a somewhat reduced scale, illustrating a preferred embodiment of the purification apparatus of the invention;

FIG. 2A is a fragmentary, longitudinal, central cross-sectional view, of one end portion of the invention, as illustrated in FIG. 1, showing the inlet end of the same;

FIG. 2B is a view, similar to that of FIG. 2A showing the outlet end of the apparatus, the wiper mechanism of the same being shown in its extended position, FIG. 2B being a longitudinal extension of FIG. 2A;

FIG. 3 is a view similar to that of FIG 2B, showing the wiper mechanism of the apparatus in its retracted position;

FIG. 4 is a cross-sectional view taken along the line 4–4 of FIG. 2A, looking in the direction indicated by the arrows;

FIG. 5 is a cross-sectional view, taken along the line 5–5 of FIG. 2A, looking in the direction indicated by the arrows; and FIG. 6 is a diagrammatic view illustrating the electric circuitry of the invention.

DETAILED DESCRIPTION OF A PARTICULAR EMBODIMENT OF THE INVENTION

Referring now to the drawings in greater detail the purification apparatus of the invention comprises elongated electric lamp 10, of the mercury vapor type, mounted in a quartz glass protective cylinder or tube 12, enclosed within an outer pipe or casing 14, having at one end an inlet connection 16 and at the other end a discharge connection 18. The entire apparatus may conveniently be enclosed in a suitable housing 20, such as a metal or plastic box, or the like.

The arrangement is such that the liquid to be purified, such as water, from any convenient source may flow into the casing 14 through the inlet connection 16 and in an annular path about the exterior of the quartz tube 12, and out of the outlet connection 18.

The pipe 14 is closed at its ends by perforated screw plugs 22 and 24, through which the quartz glass cylinder 12 is extended, suitable seal forming means, such as the O-rings 26 and 28 being provided, located in internal annular grooves in the plugs provided for the same, to form fluidtight seals between the tube and the plugs, whereby the entrance of liquid into the tube between the tube and lamp is prevented as well as leakage of liquid from the pipe 14.

The cylinder 12 is formed of quartz or other suitable material through which ultraviolet light may readily pass to expose the water or other liquid in the annular passageway 30 between the quartz tube and the pipe 14 to purify the liquid.

The lamp 10 is of a well-known type, such as a mercury vapor lamp capable of producing ultraviolet light, the lamp having at its ends the usual sockets or connector members by which electric current is supplied to the lamp in a well-known manner. The lamp may be supported in the tube 12 by any suitable means, such as bushings 32, or the like, or by other convenient means.

In order to maintain the tube 12 in a clean condition to prevent reduction of the intensity of the ultraviolet light reaching the liquid flowing through the apparatus, the tube is provided with a number of ringlike wiper elements 34 in the passageway 30, surrounding and in wiping contact with the external surface of the tube.

The wiper elements are rigidly connected together in longitudinally spaced relation by rods or wire 36, so that the elements may move simultaneously longitudinally in the passageway in wiping contact with the tube. The ring 38, which is located nearest to the outlet connection 18, is slidable in the pipe to provide a fit with the pipe such that the flow of water through the pipe from inlet 16 to outlet 18 will move the wiper assembly along the tube.

The entire wiper assembly is yieldingly urged toward the inlet end of the pipe 14 by means of a coil spring 42, which bears at one end against the element 38 and at the other end against the plug 24. By this means the wiper assembly is yieldingly urged toward the inlet end of the pipe. By this arrangement, when the water is turned on to allow an outflow of water from the outlet connection 18, the pressure of water entering through the inlet connection 16 will exert a force against the element 38 to move the same and the entire wiper assembly longitudinally against the pressure of the spring 42 until element 38 passes the outlet connection, whereupon the assembly will be held in this position as long as the water is flowing.

When the outlet connection is closed, discontinuing the outflow of water, the pressure on element 38 will become equalized through the bleeder passageway 44, allowing spring 42 to move the wiper assembly back toward the inlet connection, thus wiping the exterior of the quartz tube 12.

The wiper elements 34 are of somewhat smaller external diameter than the internal diameter of the pipe 14 so that water may flow freely past the wipers through passageway 30. The wiper elements may be formed of felt, rubber or some other suitable wiping material.

In the use of the apparatus the lamp 10 remains constantly lighted and during periods of nonuse, when no water is flowing, the wiper mechanism remains stationary, which has been found to result in the formation of cloudy rings on the interior of the glass of the lamp at locations where the wiper elements 34 and 38 are at rest for prolonged periods. The exact nature of these deposits is not known, but they are believed to be formed of very finely divided particles of mercury, or some other substance in the lamp, which are caused to adhere to the glass by the reflection of radiation from the surrounding wiper elements during operation of the lamp. Whatever the cause of the deposits, they are often built up to an extent to substantially reduce the intensity of the ultraviolet light which emanates from the lamp.

For the purpose of preventing the formation of such deposits, the apparatus includes a metal element 46 preferably in the form of a fine stainless steel wire wound spirally about the exterior of the lamp in a spiral of relatively long pitch to provide the least possible obstruction to the flow of light. The wire is attached at its ends by being wound tightly about the lamp, as seen at 48 in FIG. 2A. The positioning of the metallic element 46 in this manner has been found to result in the complete elimination of the formation of any of the above mentioned cloudy ring deposits.

At times the intensity of the ultraviolet light from the lamp 10 may be reduced by the presence in the water of various substance, such as dissolved iron, sediment, or the like, in which case the apparatus is ineffective for the purification of the water. After prolonged use of the apparatus, discoloration of the quartz tube may also take place due to depositing of iron or the like on the outer surface of the tube despite the wiping of the same by the wiper elements, so that the intensity of the ultraviolet light reaching the water is reduced to an extent to prevent effective purification.

In order to prevent the flow of water through the apparatus when the intensity of the ultraviolet light is insufficient to accomplish proper purification, a valve 50 of any suitable type is provided in the system, as by connecting the same into the inlet connection 16, which valve is adapted to be operated by a solenoid 52, or other suitable electric means, under the control of photoelectric cell or electric eye mechanism, generally designated 54, positioned to be exposed to ultraviolet light passing through the water in the apparatus from the lamp 10, and responsive to the intensity of such light to cause the valve to be closed when the intensity falls below a predetermined value. The electric eye is of a well known type sensitive to ultraviolet light to be activated thereby to furnish current to the solenoid 52 to maintain the valve 50 open as long as the intensity of the light reaching the photoelectric cell is sufficient to effectively purify the water. The photocell 56 of the electric eye is suitably mounted in a housing attached to the pipe 14, by a tubular fitting 58 through which ultraviolet light from the lamp 10, passing through the water in the passageway 50 may reach the photocell through an aperture 60 of an aperture plate 62, as best shown in FIGS. 2A and 5. The housing may also be provided with a slide 64, formed of transparent material and which is removably positioned in the housing and for which suitable seal forming means, such as the O-ring 66 is provided, positioned to prevent leakage of water from the pipe 14. The aperture 60 may take the form of an elongated opening, and the plate may be provided with a screw 68 extending into the aperture and which is threadably adjustable to regulate the size of the aperture by which the amount of light passing to the photocell may be accurately adjusted.

The lamp 10 is furnished with electric current from any suitable source, such as a domestic electric lighting system, through conductors 70 and 72, and the lamp circuit is provided with a transformer or ballast 76, or other suitable starter mechanism by which the lamp is operated in a well known manner.

The photocell 56 and solenoid 52, are connected into a branch circuit having a manually operated switch 78, of the type which must be manually held in closed position and which opens as soon as released, for closing the circuit to cause the lamp 10 to light. A relay 80 is also connected into the photo cell and solenoid circuit, which will be closed when the lamp 10 has warmed up and the intensity of ultraviolet light from the lamp reaches a predetermined value, whereupon the photocell will complete the solenoid circuit to maintain the valve 50 open, until the intensity of ultraviolet light reaching the photocell falls below a predetermined value, whereupon the relay will open to cause the valve 50 to close.

It will also be seen that by this arrangement the valve 50 does not open until the ultraviolet light from lamp 10 reaches an intensity to be effective to purify the water, so that there will be no flow of water through the apparatus before the lamp has warmed up to provide ultraviolet light of sufficient intensity to accomplish purification of the water, and in the event that the water becomes cloudy or for some other reason the intensity of the light passing to the photocell is insufficient for purification, the valve 50 will be closed automatically.

During the reciprocating movement of the wiper assembly the coil spring will be compressed and extended causing the spring to wind up and unwind somewhat, which tends to rotate the wiper elements 34 and 38, thus imposing a twisting action on the wires or rods 36. In time such twisting action sometimes moves the wire circumferentially relative to the pipe 14 so that one of the wires may be interposed between the lamp and the photocell, thus cutting off the light to the photocell and shutting off the flow of water. In order to prevent such twisting action one or more additional or auxiliary rods 82 may be provided in the pipe 14 extending longitudinally therein and secured in place as shown, by bending the rod at its ends and inserting the same into small holes in the wall of the pipe. The additional rod or rods extend across and beyond the location of the photocell mechanism 54 and the wiper elements 34 may be suitably notched as shown at 84 in FIG. 4 to slidably receive the rods whereby the wiper assembly may move freely longitudinally therealong, but will be effectively held against twisting or rotational movement which might result in moving one of the wire or rods 36 to a position to interfere with the passage of light to the photocell.

For convenience, and to protect the equipment, the entire apparatus may be enclosed in a suitable housing 86 provided with a transparent observation window.

In using the invention, the current from the source to the conductors 70 and 72 is turned on to activate the lamp 10, and as soon as the lamp is lighted the switch 78 is manually closed to furnish current to the solenoid 52 to open valve 50. In the event that the lamp has not warmed up to a point to provide ultraviolet light of sufficient intensity to properly purify the water there will be insufficient current flow through the photocell 56 to energize the solenoid 52 when the switch 78 is released and the valve 50 will immediately close, necessitating reclosing of the switch when the lamp has warmed up. This will prevent the flow of water through the apparatus before the same is in condition to properly treat the water.

When the apparatus has been placed in operation, a decrease in the intensity of the ultraviolet light reaching the photocell below a predetermined value, due to discoloration of the glass, clouding of the water or a worn out lamp, or similar condition, will result in insufficient current flow to the relay 80 which will then open to shut off the current supply to the solenoid 52, thus allowing valve 50 to close.

It will thus be seen that the invention provides apparatus for the purification of water by ultraviolet light embodying means for cutting off the flow of water in the event of failure of the apparatus to provide ultraviolet light of sufficient intensity to accomplish proper purification.

The invention is disclosed herein in connection with a particular embodiment of the same, which is intended by way of illustration only, it being evident that various changes can be made in the construction and mode of operation of the same, within the spirit of the invention and the scope of the appended claims.

I claim:

1. In water purification apparatus an elongated tubular electric lamp providing a source of ultraviolet illumination, a protective cylinder formed of a material transparent to ultraviolet light surrounding said lamp, means forming with said cylinder an annular passageway externally of the cylinder through which water may flow in light receiving relation to said source, wiper means movably disposed in the passageway for longitudinal movement therein in wiping contact with said cylinder, and metallic means positioned between said lamp and said wiper means extending substantially throughout the path of movement of said wiper means and shaped to allow substantially unobstructed passage of light into said passageway.

2. The water purification apparatus as claimed in claim 1 wherein said metallic means is filiform and is spirally wound about the exterior of said lamp.